United States Patent
Sandberg et al.

(10) Patent No.: US 10,792,970 B2
(45) Date of Patent: Oct. 6, 2020

(54) METHOD FOR A VEHICLE, AN ARRANGEMENT FOR A VEHICLE AND A VEHICLE

(71) Applicant: Volvo Car Corporation, Gothenburg (SE)

(72) Inventors: Anders Sandberg, Sävedalen (SE); Tobias Brandin, Hålta (SE)

(73) Assignee: Volvo Car Corporation, Gothenburg (SE)

( * ) Notice: Subject to any disclaimer, the term of this patent is extended or adjusted under 35 U.S.C. 154(b) by 63 days.

(21) Appl. No.: 16/161,213

(22) Filed: Oct. 16, 2018

(65) Prior Publication Data

US 2019/0160905 A1 May 30, 2019

(30) Foreign Application Priority Data

Nov. 28, 2017 (EP) .................................... 17204085

(51) Int. Cl.
*B60G 17/016* (2006.01)
*B60G 17/06* (2006.01)
(Continued)

(52) U.S. Cl.
CPC ........... *B60G 17/016* (2013.01); *B60G 13/04* (2013.01); *B60G 13/08* (2013.01); *B60G 13/10* (2013.01);
(Continued)

(58) Field of Classification Search
None
See application file for complete search history.

(56) References Cited

U.S. PATENT DOCUMENTS

| 4,846,317 A * | 7/1989 | Hudgens ............ B60G 17/0152 188/266.5 |
| 5,203,584 A * | 4/1993 | Butsuen ............. B60G 17/0165 280/5.519 |

(Continued)

FOREIGN PATENT DOCUMENTS

| DE | 102015202405 A1 | 8/2016 |
| EP | 1959155 A1 | 8/2008 |

(Continued)

OTHER PUBLICATIONS

May 4, 2018 European Search Report issue on International Application No. EP17204085.

*Primary Examiner* — Drew J Brown
(74) *Attorney, Agent, or Firm* — Clements Bernard Walker; Christopher L. Bernard

(57) ABSTRACT

A method for a vehicle comprising at least one wheel suspension with at least one damper, wherein the at least one damper is such that it can adjust its damping resistance between a first damping mode and at least a second damping mode, wherein the second damping mode presents a larger damping resistance than a damping resistance of the first damping mode. The method comprises the steps: S1) identifying if the vehicle is in a first situation during driving of said vehicle which may lead to a subsequent impact force (F) on the at least one wheel suspension which is of a magnitude such that the at least one damper, when in its first damping mode, will reach a position where no further damping can be performed; and, if this is the case, S2) adjusting the damping resistance from the first damping mode to the at least second damping mode.

15 Claims, 4 Drawing Sheets

(51) Int. Cl.
  *B60N 2/00* (2006.01)
  *B60G 17/0165* (2006.01)
  *B60G 13/04* (2006.01)
  *B60G 13/08* (2006.01)
  *B60G 13/10* (2006.01)

(52) U.S. Cl.
  CPC ......... *B60G 17/0165* (2013.01); *B60G 17/06* (2013.01); *B60N 2/002* (2013.01); B60G 2202/242 (2013.01); B60G 2204/62 (2013.01); B60G 2400/10 (2013.01); B60G 2400/102 (2013.01); B60G 2400/204 (2013.01); B60G 2400/252 (2013.01); B60G 2400/62 (2013.01); B60G 2400/80 (2013.01); B60G 2401/14 (2013.01); B60G 2401/174 (2013.01); B60G 2401/176 (2013.01); B60G 2401/28 (2013.01); B60G 2500/10 (2013.01); B60G 2500/106 (2013.01)

(56) References Cited

U.S. PATENT DOCUMENTS

| | | | |
|---|---|---|---|
| 5,259,487 A * | 11/1993 | Petek | F16F 9/532 188/267.1 |
| 6,092,011 A * | 7/2000 | Hiramoto | F16F 9/466 701/37 |
| 10,047,817 B2 * | 8/2018 | Ericksen | B60G 17/0161 |
| 2005/0080530 A1 | 4/2005 | Arduc et al. | |
| 2010/0179730 A1 | 7/2010 | Hiemenz et al. | |
| 2012/0018263 A1 * | 1/2012 | Marking | F16F 9/065 188/266.2 |
| 2013/0292218 A1 * | 11/2013 | Ericksen | F16F 9/464 188/266.2 |
| 2014/0125018 A1 * | 5/2014 | Brady | B60G 17/016 280/5.519 |
| 2014/0195113 A1 | 7/2014 | Lu et al. | |
| 2015/0057885 A1 * | 2/2015 | Brady | B60G 17/06 701/38 |
| 2015/0081171 A1 | 3/2015 | Owen et al. | |
| 2018/0141543 A1 * | 5/2018 | Krosschell | B60W 30/02 |
| 2019/0283519 A1 * | 9/2019 | Ericksen | B60G 17/016 |

FOREIGN PATENT DOCUMENTS

| | | |
|---|---|---|
| EP | 2910468 A1 | 8/2015 |
| EP | 3126167 | 10/2015 |
| FR | 2857301 A1 | 1/2005 |

\* cited by examiner

METHOD FOR A VEHICLE, AN ARRANGEMENT FOR A VEHICLE AND A VEHICLE

CROSS-REFERENCE TO RELATED APPLICATION

The present patent application/patent claims the benefit of priority of co-pending European Patent Application No. 17204085.9, filed on Nov. 28, 2017, and entitled "A METHOD FOR A VEHICLE, AN ARRANGEMENT FOR A VEHICLE AND A VEHICLE," the contents of which are incorporated in full by reference herein.

TECHNICAL FIELD

The present disclosure relates to a method for a vehicle comprising at least one wheel suspension with at least one damper and to an arrangement for a vehicle comprising at least one wheel suspension with at least one damper. Moreover, the present disclosure relates to a vehicle and to a computer-readable storage medium storing a program which causes a computer to execute the method.

BACKGROUND

An important area when developing passenger vehicles, especially passenger cars, is to increase the safety for the occupants in the vehicle. A lot of progress has been made during the years. For example; seat belts, airbags, whiplash protection systems etc. have been introduced, which have significantly increased occupant safety.

However, vehicle occupant safety is an area which always can be improved further until reaching a state where no occupants of the vehicle are injured any longer.

SUMMARY

In view of the above, at least one object of the present invention is to provide an improved method and arrangement for a vehicle which reduces the risk of at least one user being injured during an accident or incident of the vehicle. More particularly, an object of the present invention is to prevent, or at least reduce the risk of a spine injury of at least one user in the vehicle.

The above and other objects may be provided by the subject matter as presented in the independent claims. Preferred and advantageous embodiments can be found in the dependent claims and in the accompanying description.

According to a first aspect, the objects are at least partially achieved by a method for a vehicle comprising at least one wheel suspension with at least one damper, wherein the at least one damper is such that it can adjust its damping resistance between a first damping mode and at least a second damping mode, wherein the at least second damping mode presents a larger damping resistance than a damping resistance of the first damping mode. The method comprises:
identifying if the vehicle is in a first situation during driving of said vehicle which may lead to a subsequent impact force on the at least one wheel suspension which is of a magnitude such that the at least one damper, when in its first damping mode, will reach a position where no further damping can be performed; and, if this is the case, and
adjusting the damping resistance from the first damping mode to the at least second damping mode.

Optionally, the identifying step may be defined as identifying if the vehicle is in a first situation during driving of said vehicle which will lead to a subsequent impact force on the at least one wheel suspension which is of a magnitude such that the at least one damper, when in its first damping mode, will reach a position where no further damping can be performed.

Optionally, the identifying step may be defined as identifying when the vehicle is in a first situation during driving of said vehicle which may, or will, lead to a subsequent impact force on the at least one wheel suspension which is of a magnitude such that the at least one damper, when in its first damping mode, will reach a position where no further damping can be performed.

Optionally, the adjusting step may be performed when it has been identified that the vehicle is in the first situation.

The inventors have realized that it would be advantageous to use the above mentioned method for a vehicle and also to use a damper with the above-mentioned characteristics in order to reduce the magnitude of vertical component forces on the occupants' bodies and therefore the risk of serious spine injuries, and also other body related injuries, of users in the vehicle. More particularly, by increasing the damping resistance before a high impact force is exerted on the at least one wheel suspension, a larger portion of the impacted force on the wheel suspension may be damped and thereby a possible force transferred to any user in the vehicle may be reduced. Still further, with the present invention it may even be possible to adjust the damping resistance before a wheel of the wheel suspension touches ground after an airborne situation. In the event that the at least one damper would not adjust and increase its damping resistance in the above situations, it is more likely that the occupants in the vehicle would be injured. With the above mentioned method according to the first aspect, the risk of serious injuries, especially spine injuries, may be reduced. Optionally, the first damping mode of the damper may be a normal damping mode which is used during normal driving of the vehicle. Still optionally, the at least second damping mode may be a damping mode which is not used in normal driving conditions, and which also may have a too high damping resistance for a normal driving situation.

Optionally, the impact force may further be of a magnitude such that at least one user of the vehicle may, or will, get hurt when the at least one damper is in its first damping mode. Still optionally, the impact force may further be of a magnitude such that a spine of the at least one user may, or will, get injured when the at least one damper is in its first damping mode. In this document, the expressions user, passenger, driver and occupant of the vehicle is used. It shall be noted that unless expressed otherwise, a user/passenger/driver/occupant of the vehicle is anyone being located in the vehicle during a driving situation, and more particularly anyone who is positioned in a vehicle chair/seat in the vehicle.

In this document, driving of the vehicle may be defined as when the vehicle is moving in at least one direction, preferably in a forward or rearward direction of the vehicle. Still optionally, driving of the vehicle may be defined as when the vehicle is moving with a speed exceeding a certain value, such as a speed from 30 kilometers per hour (km/h), from 40 km/h, from 50 km/h, from 60 km/h, or from 70 km/h.

Optionally, the adjustment of the damping resistance may be performed when the first situation is identified, or at least before the subsequent impact force impacts the wheel suspension.

Optionally the first situation may be identified by measuring at least one of the following:
- an acceleration, or a change of acceleration, in at least one of an x-, y- or z-direction of the vehicle,
- a rotation, or a change of rotation, in respect of at least one of a x-, y- or z axis of the vehicle,
- a speed of the vehicle,
- a driving direction, or a change of a driving direction, of the vehicle,
- a force acting on the at least one wheel suspension during driving,
- a wheel speed of a wheel of the at least one wheel suspension,
- a distance to an external object during driving of the vehicle,
- an altitude change of the vehicle or of at least one wheel of the vehicle during driving,
- that at least one wheel suspension of the vehicle has reached an extended outmost position, for example a rebound position, and
- a force acting on at least one vehicle seat during driving.

Optionally, identifying if the vehicle is in the first situation may be performed by identifying if any one or a combination of the above mentioned measured values exceeds predetermined values. Just as a matter of example, by measuring a change in acceleration and rotation of the vehicle the first situation may be identified.

In this document, the x-, y- or z axis and x-, y- or z direction refer to a three-axis Cartesian coordinate system presenting three separate axes which are oriented pair-wise perpendicularly to each other. The x-axis preferably relates to a driving direction, also a longitudinal direction, of the vehicle, the y-axis to an axis being transverse to the driving direction, and the z-axis to a vertical axis of the vehicle. Just as a matter of example, the impact force may be a force which substantially is directed in the z-direction, or the vertical direction, of the vehicle.

Optionally, the first situation may be a situation where at least one side of the vehicle is airborne, or the complete vehicle is airborne. Identifying if, or when, at least a side of the vehicle is airborne may be sufficient for knowing that the at least one wheel suspension will, or most likely will be exposed of an impact force which is so high that the at least one damper will reach a position where no further damping may be performed. Thus, by identifying if the vehicle is at least partially airborne and then increasing the damping resistance, the risk of occupant injuries may be reduced. The identification that the vehicle is airborne may be made by for example measuring acceleration in a vertical direction, or z-direction, of the vehicle. Just as a matter of example, the identification of the first situation may be made by identifying if the vertical acceleration of the vehicle exceeds a predetermined value. As another non-limiting example, identifying that the vehicle is at least partially airborne may be performed by measuring if at least one wheel suspension has reached an extended outmost position. This is also known as rebound. More specifically, if there is no, or almost no, load exerted on the at least one wheel suspension the wheel suspension may be in an outmost position, i.e. the wheel is not in contact with ground.

Optionally, the first situation may be defined as a risk situation where the vehicle will, or at least it is very likely that the vehicle will, be in an accident or serious incident, such as crashing into another object, driving off the road etc. Still optionally, the first situation may be defined as the beginning, or an initial phase, of an accident, such as a crash, driving off the road etc.

Optionally, the at least one damper may be further be configured such that the damping modes may be manually adjusted. There may be situations where it may be advantageous for an occupant of the vehicle to manually adjust between the damping modes.

Optionally, the at least one damper may be further configured such that it can adjust its damping resistance to at least a third damping mode which presents a damping resistance which is larger than the damping resistance of the second damping mode. Just as a matter of example, it may be so that the method is able to identify the level of the coming impact force, and as a consequence, the damper adjusts to a corresponding damping resistance reflecting the level of the estimated impact force to give the optimal protection for the occupants. Thereby a more versatile method may be provided, which is adaptable to more situations. Optionally, the damping resistance may be adjusted from the first damping mode to the at least second or third damping mode depending on the magnitude of the subsequent impact force. Still further, the at least one damper may also be configured such that it can adjust its damping resistance in a continuous range of different resistances, thereby presenting a plurality of damping modes.

Optionally, the method may further comprise a step of identifying in which seat of the vehicle at least one user is present, and thereafter at least adjust the damping resistance of the at least one damper for a wheel suspension which has the largest impact on the seat where the at least one user is present. Thereby a further improved method may be provided.

Optionally, the at least one wheel suspension is a wheel suspension of a rear axle of the vehicle, thereby being able to reduce the risk of at least one occupant in the back seat of the vehicle being hurt. A vehicle rear axle may be located closer to a occupant seat compared to a front seat, and therefore it may be especially advantageous to make use of the method for a wheel suspension of the rear axle.

According to a second aspect, the object is at least partially achieved by a computer-readable storage medium storing a program which causes a computer to execute a method according to the first aspect of the invention. The advantages of the second aspect of the invention are analogous to the advantages of the first aspect of the invention. It shall also be noted that all embodiments of the first aspect of the invention are applicable to and combinable with all embodiments of the second aspect of the invention and vice versa.

According to a third aspect of the invention, the object is at least partially achieved by an arrangement for a vehicle, which comprises at least one wheel suspension with at least one damper, wherein the at least one damper is such that it can adjust its damping resistance between a first damping mode and at least a second damping mode, wherein the at least second damping mode presents a larger damping resistance than a damping resistance of the first damping mode. The arrangement is adapted to:
- identify if the vehicle is in a first situation during driving of said vehicle which may lead to a subsequent impact force on the at least one wheel suspension which is of a magnitude such that the at least one damper, when in its first damping mode, will reach a position where no further damping can be performed, and
- adjust the damping resistance from the first damping mode to the at least second damping mode if it is identified that the vehicle is in the first situation.

Optionally, the arrangement may be adapted to identify if or when the vehicle is in a first situation during driving of said vehicle which may or will lead to a subsequent impact force on the at least one wheel suspension. Still optionally, the arrangement may be adapted to adjust the damping resistance from the first damping mode to the at least second damping mode when it is identified that the vehicle is in the first situation.

The advantages of the third aspect of the invention are analogous to the advantages presented in relation to the first aspect of the invention. It shall also be noted that all embodiments of the third aspect of the invention are applicable to and combinable with any of the embodiments of the first and second aspect of the invention and vice versa, unless explicitly expressed otherwise.

Optionally, the at least one damper may further be such that it presents at least a third damping mode which presents a damping resistance which is larger than the damping resistance of the second damping mode.

Optionally, the at least one damper is any one of a high impact damper, a pneumatic damper, a hydraulic damper or an electromagnetic damper. Just for the sake of clarity, any such damper is also applicable to the first aspect of the invention. A high impact damper may be defined as a damper that has at least one damping mode which is used in a normal driving situation and further at least a second harder damping mode with a larger damping resistance which may be used when or if the damper is exposed to larger forces. The high impact damper may for example be a hydraulic damper, such as an oil damper which is able to switch between at least two damping modes. Just for the sake of clarity, a damper may also be known as a shock absorber. A damper or shock absorber may for example transform kinetic energy into another form of energy, such as heat. Still optionally, the at least one damper may be electrically controlled such that it can adjust its damping resistance between a first and at least a second damping mode. By having an electrically controlled damper it may be possible to adjust the damping resistance before a high impact force is exerted on the at least one wheel suspension. Thereby an increased safety may be provided for the occupants of the vehicle. Still optionally, the at least one damper may be configured such that is able to adjust between a first and at least a second damping mode even if there is an electrical power failure. Thereby an even further improved safety may be provided since such a damper would still be able to increase its damping resistance even if there was an electrical power failure.

Optionally, the arrangement may comprise at least one sensing element configured to sense a condition indicative of the first situation. Just as a matter of example, the at least one sensing element may be any one of an accelerometer, a gyro-sensor, a speed sensor, a force sensor, a camera, a LIDAR (Light Detection And Ranging) sensor, an ultrasonic sensor, a radar (radio detection and ranging) sensor, a sonar (sound navigation and ranging) sensor, an altitude sensor, a wheel suspension position sensor, a seat force sensor or any other sensor that can detect and identify that the vehicle is in a situation where the at least one damper eventually may reach its position where no further damping can be performed. Just for the sake of clarity, any such sensing element is also applicable to the first aspect of the invention.

Optionally, the first situation may be a situation where at least one side of the vehicle is airborne, or the complete vehicle is airborne. Identifying if, or when, at least a side of the vehicle is airborne may be enough for knowing that the at least one wheel suspension will be exposed to an impact force which is so high that the at least one damper will reach a position where no further damping can be performed.

Thus, by identifying if the vehicle is at least partially airborne and then increasing the damping resistance, the risk of occupant injuries may be reduced.

Optionally the first situation may be identified by the at least one sensing element measuring at least one of the following:
   an acceleration, or a change of acceleration, in at least one of an x-, y- or z-direction of the vehicle,
   a rotation, or a change of rotation, in respect of at least one of a x-, y- or z axis of the vehicle,
   a speed of the vehicle,
   a driving direction, or a change of a driving direction, of the vehicle,
   a force acting on the at least one wheel suspension during driving,
   a wheel speed of a wheel of the at least one wheel suspension,
   a distance to an external object during driving of the vehicle,
   an altitude change of the vehicle or of at least one wheel of the vehicle during driving,
   that at least one wheel suspension of the vehicle has reached an extended outmost position, for example a rebound position, and
   a force acting on at least one vehicle seat during driving.

Optionally, the impact force may further be of a magnitude such that at least one user of the vehicle may, or will, get hurt when the at least one damper is in its first damping mode. Still optionally, the impact force may further be of a magnitude such that a spine of the at least one user may, or will, get injured when the at least one damper is in its first damping mode.

According to a fourth aspect of the invention, the object is at least partially achieved by a vehicle comprising an arrangement according to the third aspect of the invention and/or a computer-readable storage medium according to the second and aspect of the invention. In a preferred embodiment, the vehicle is a passenger vehicle, most preferably a passenger car. The advantages of the fourth aspect of the invention are analogous to the advantages presented in relation to the first aspect of the invention. It shall also be noted that all embodiments of the fourth aspect of the invention are applicable to and combinable with any of the embodiments of the first, second and third aspects of the invention and vice versa, unless explicitly expressed otherwise.

Optionally, any one of the embodiments of the present invention may also be advantageously combined with an active wheel suspension system. For example, an active wheel suspension system may be a system which continuously controls chassis characteristics of the vehicle and may further comprise active dampers. These systems may for example be able to adjust between different normal driving modes, such as comfort, sport etc. Such systems are well known and combining it with the present invention may further improve vehicle safety.

BRIEF DESCRIPTION OF DRAWINGS

Exemplifying and preferred embodiments of the present invention will now be described more in detail, with reference to the accompanying drawings, wherein.

Figure 1:
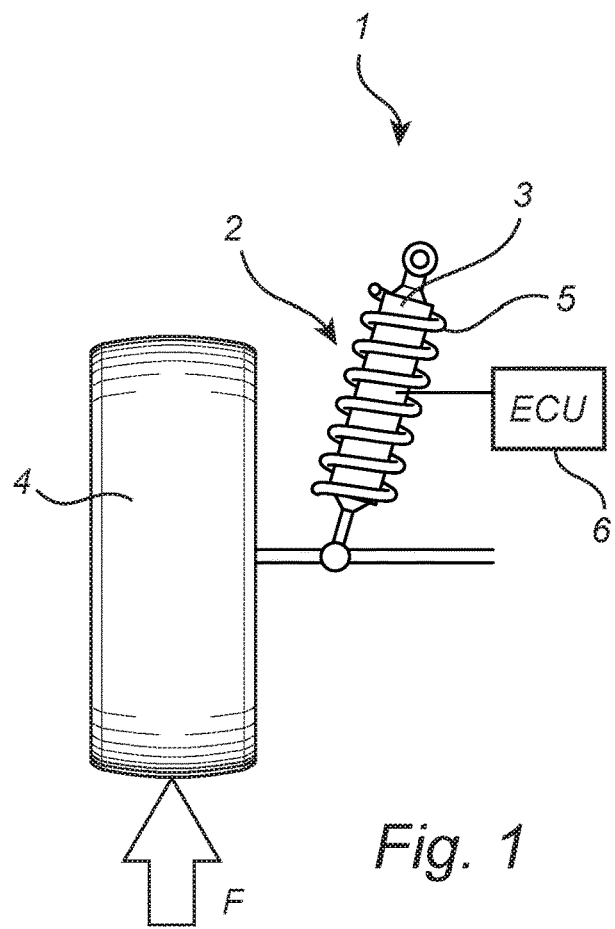
FIG. 1 shows an example of an arrangement according to an embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

In FIG. 1, an example embodiment of an arrangement 1 according to the present invention is shown. The arrangement 1 comprises at least one wheel suspension 2 with at least one damper 3, wherein the at least one damper 3 is such that it can adjust its damping resistance between a first damping mode and at least a second damping mode, wherein the second damping mode presents a larger damping resistance than a damping resistance of the first damping mode. The arrangement 1 is adapted to:
- identify if the vehicle 10 (not shown) is in a first situation during driving of said vehicle 10 which may lead to a subsequent impact force F on the at least one wheel suspension 2 which is of a magnitude such that the at least one damper 3, when in its first damping mode, will reach a position where no further damping can be performed, and
- adjust the damping resistance from the first damping mode to the at least second damping mode if it is identified that the vehicle 10 is in the first situation.

As can be seen from the figure, the wheel suspension 2 is connected to a wheel 4 of the vehicle 10. The impact force F, which may be an essentially vertical force, is exerted on the wheel 4 and is then transferred to the wheel suspension 2. The wheel suspension 2 further comprises in this embodiment a coil spring 5 which is arranged such that the damper 2 is at least partially located within the coil spring 5. Still further, an electronic control unit 6 (ECU) is arranged to be in communicative contact with the damper 3. The communication may for example be performed by an electrical wire (as indicated in the figure) or by wireless transmission between the ECU 6 and the damper 3. The step of identifying if, or when, the vehicle 10 is in a first situation during driving of said vehicle 10 may be performed by the ECU 6, which may receive at least one signal from at least one sensing element (not shown) of the vehicle 10 in order to identify the risk situation, i.e. the first situation. The sensing element may for example be an accelerometer and/or a gyro sensor of the vehicle 10 that identifies an acceleration, or an acceleration change, and/or a rotation, or a rotational change, of the vehicle 10 and the ECU 6 uses this information for establishing if it is likely that the damper 3 of the wheel suspension 2 will reach a compressed (jounce) position where no further damping can be performed, i.e. the wheel suspension 2 has reached its bump stop. Just as a matter of example, the sensing elements, e.g. accelerometer and/or gyro sensor, may identify that the vehicle 10 has become airborne with a certain altitude above the ground which will lead to that the first damping resistance of the damper 3 will not be large enough for damping the impact force that the wheel suspension 2 will be exposed to when touching the ground after the airborne situation. In this situation, the damper 3 will then adjust its damping mode from the first damping mode to the at least second damping mode with a larger damping resistance, which is preferably performed before touch down or in some cases a fraction of a second after, in order to reduce the risk that a user in the vehicle 10 may get injured. When the ECU 6 has identified that the vehicle 10 is in the risk situation it sends a signal to the damper 3 which leads to that the damper 3 adjusts its damping resistance from the first to the at least second damping mode. The ECU 6 may comprise a computer-readable storage medium which comprises a method according to an embodiment of the first aspect of the invention.

Figure 2:
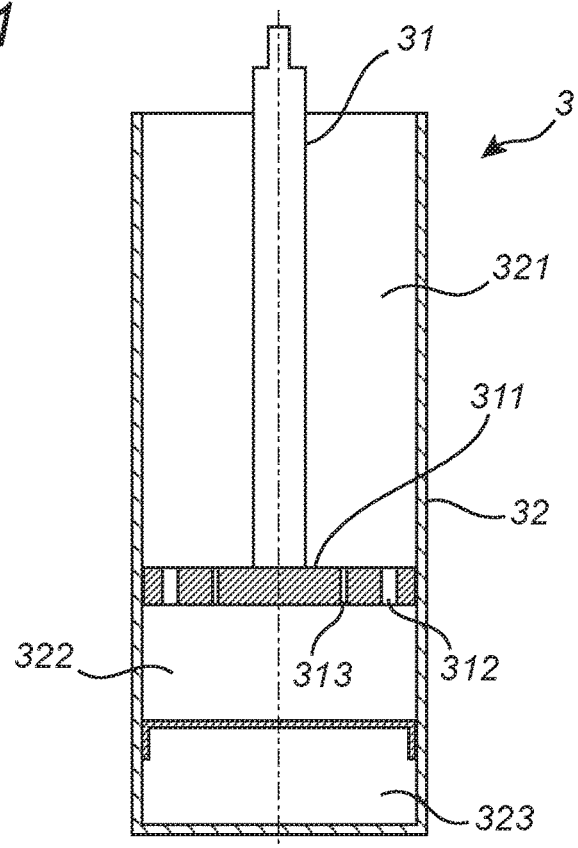
FIG. 2 shows an example of a damper or shock absorber of an arrangement according to an embodiment of the present invention.

In FIG. 2, a cross section of a damper 3 according to an example embodiment of the invention is shown. The damper 3 comprises a piston 31 with a piston head 311 located within a cylinder 32. The damper 3 is a hydraulic damper wherein the cylinder 32 is at least partially filled with a fluid, typically oil. The piston head 311 presents at least two separate fluid channels 312 and 313, in which fluid can be transferred between a first and a second volume, 321 and 322 respectively, of the cylinder 32 when the piston 31 moves in the damper's longitudinal direction in the cylinder 32. As can be seen in FIG. 2, the two channels 312 and 313 present different diameters in the cross sectional view. The damper 3 is arranged to switch between a first damping mode and at least a second damping mode by using, i.e. allow fluid to be transferred in, both or only one of the first channel 312 and the second channel 313. The channels 312 and 313 comprise a first and second respective valve (not shown), which can open and close the respective channels, thereby allowing fluid to pass in either the first channel 312, corresponding to the first damping mode, or in the second channel 313, corresponding to the at least second damping mode. Both channels 312 and 313 may also be open in the first mode and only one channel open in the at least second mode. In an example, the valves may be configured such that the flow is larger in one direction, such as in rebound direction. The valves for the channels are preferably controlled by the ECU 6 as seen in FIG. 1. A volume 323 in the cylinder 32 is adjustable for compensating for that the total volume of 321 and 322 will change when the piston 31 moves into the cylinder 32. The volume 323 may preferably be filled with a gas. As an alternative of using at least two valves, the damper 3 may alternatively comprise at least one valve which can adjust the flowing rate between at least two different damping modes. Additionally, the damper 3 may also comprise more than two valves. Moreover, the damper 3 has reached a position where no further damping can be performed when all, or almost all, of the fluid has been transferred from the volume 322 to the volume 321. In other words, the piston head 311 has reached a position in the cylinder 32 where no further damping may be performed.

Figure 3:
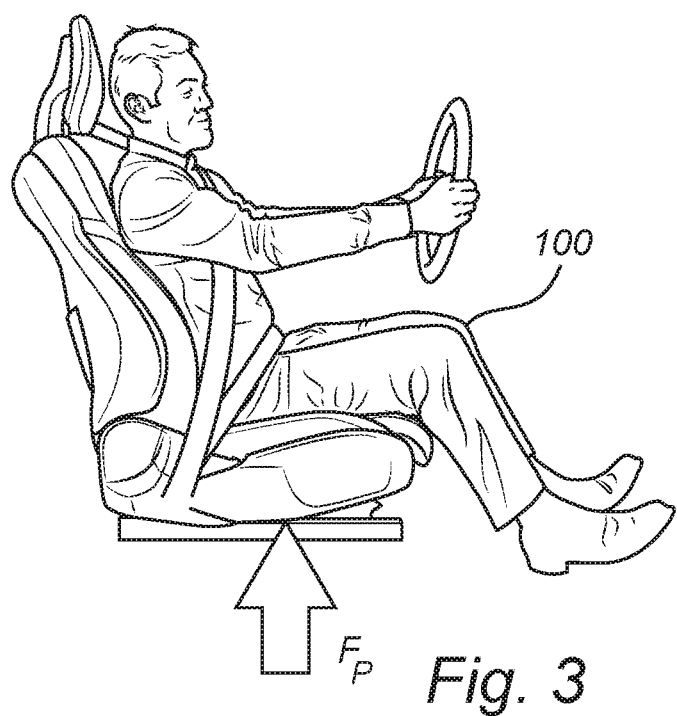
FIG. 3 shows an example of a situation wherein a vehicle driver is exposed to a force which may lead to a spine or back injury.

In FIG. 3, a driver 100 of the vehicle 10 can be seen, which is exposed to a force $F_p$. The force $F_p$ may be a substantially vertical force. Such a force $F_p$ may for example be generated when the vehicle 10 touches ground after being airborne. The vehicle could for example become airborne after driving into a ditch in high speed or the like. With the present invention, the force $F_p$ exerted on the driver 100 may be reduced since the damper 3 may adjust from its first damping mode, e.g. a normal or standard damping mode, to at least a second damping mode which presents a larger damping resistance than the first damping mode. Thereby a spine injury, or any other serious injury, of the user 100 may be prevented, or at least reduced.

Figure 4:
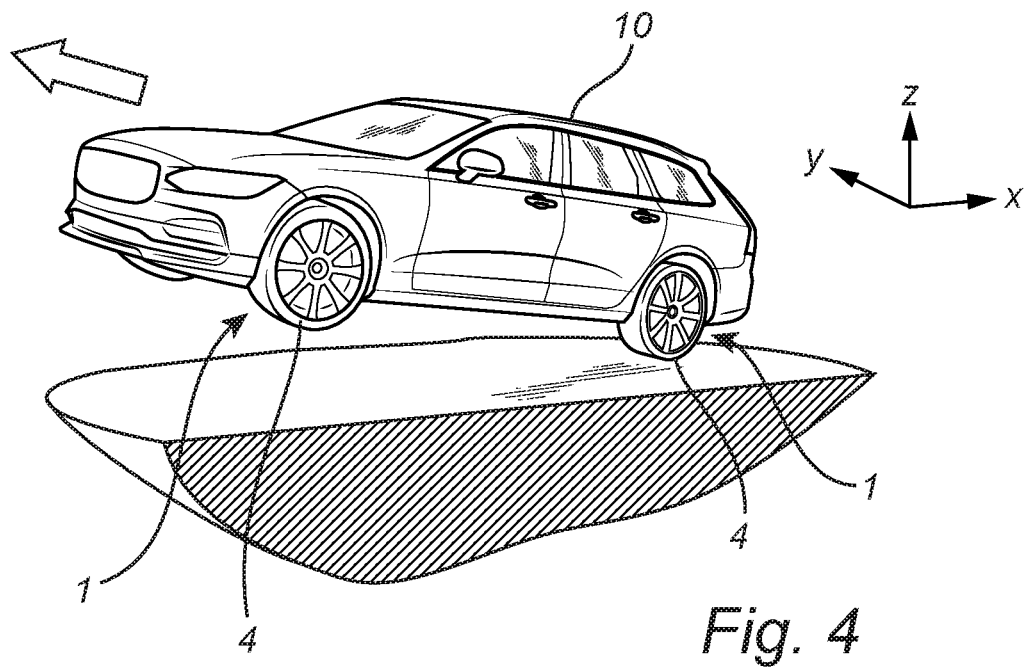
FIG. 4 shows an example of a first situation according to an embodiment of the present invention where a vehicle is airborne.

In FIG. 4, a vehicle 10 comprising an arrangement 1 (not shown) according to an embodiment of the present invention is shown. The vehicle 10 is in a first situation where it has become airborne and moves in a direction of the arrow as shown in the figure. The situation has been identified by the use of at least one sensing element in the vehicle 10, which as described hereinabove may for example be a gyro sensor, an accelerometer, altitude sensor etc. Since it has been identified that the vehicle 10 is in the first situation, the damper 3 of at least one of the wheel suspensions 2 will adjust its damping mode to a second damping mode which present a larger damping resistance than the first damping mode, and thereby reducing the risk of a user 100 being exposed to a force $F_p$ which is of a magnitude such that the user 100 may get seriously injured. The first situation may for example be identified by identifying if the acceleration or a change of acceleration, in any one of the x-, y- or z-direction exceeds predetermined values. Also, the first situation may be identified by using a combination of input parameters, such as acceleration, speed, vehicle rotation, altitude of the vehicle etc. Moreover, it may also be identified by comparing such input parameters from the at least one sensing element of the vehicle 10 with empirical data. Empirical data may have been collected by testing different situations, i.e. subjecting a vehicle to different accidents and incidents, such as driving into a ditch, driving over a big bump on a road, releasing a vehicle from certain heights etc. Such empirical data may for example be collected by the vehicle manufacturer, or the like. The empirical data may comprise one or several different parameters which correspond to different situations where the vehicle 10, or the wheel suspensions 2 of the vehicle 10, subsequently may be exposed to a certain impact force F during driving which is of a magnitude such that the at least one damper 3, when in its first damping mode, will reach a position where no further damping can be performed. Thereby, by comparing real-time data during driving of the vehicle 10 with the collected empirical data such risk situations may be identified. The collected data may for example be stored in a database 400 (as can be seen in FIG. 6) in the vehicle 10.

Figure 5:
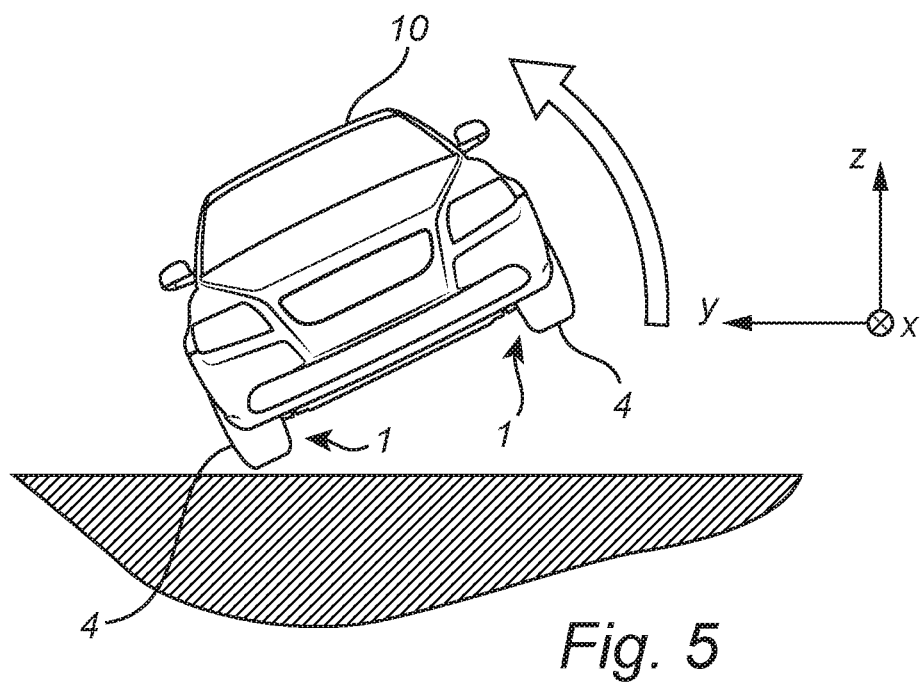
FIG. 5 shows an example of a first situation according to an embodiment of the present invention where a vehicle is partially airborne or tilted.

In FIG. 5, a vehicle 10 comprising an arrangement 1 (not shown) according to an embodiment of the present invention is shown. Here it can be seen that one side of the vehicle 10 has become airborne. The arrow shows that the vehicle 10 is tilted and has rotated about the x-axis in relation to the ground during driving. The arrangement 1 is adapted to identify a first situation as described hereinabove and thereafter adjust the damping resistance from the first damping mode to the at least second damping mode of the at least one damper 3. In this particular situation, it may only be the wheel suspensions 2 on the right side of the vehicle 10 that adjust its damping resistance. In certain embodiments, the arrangement 1 and the method for the vehicle 10 may thus be able to also identify which one(s) of the four wheel suspensions 2 of the vehicle that should be adjusted accordingly, and which one(s) that should not be adjusted. Just as a matter of example, in the situation shown in FIG. 5, it may be so that it is preferred to not change the damping resistances of the wheel suspensions 2 for the wheels 4 on the left side of the vehicle 10. Increasing the damping resistance for those wheel suspensions 2 could even lead to a worse situation.

Figure 6:
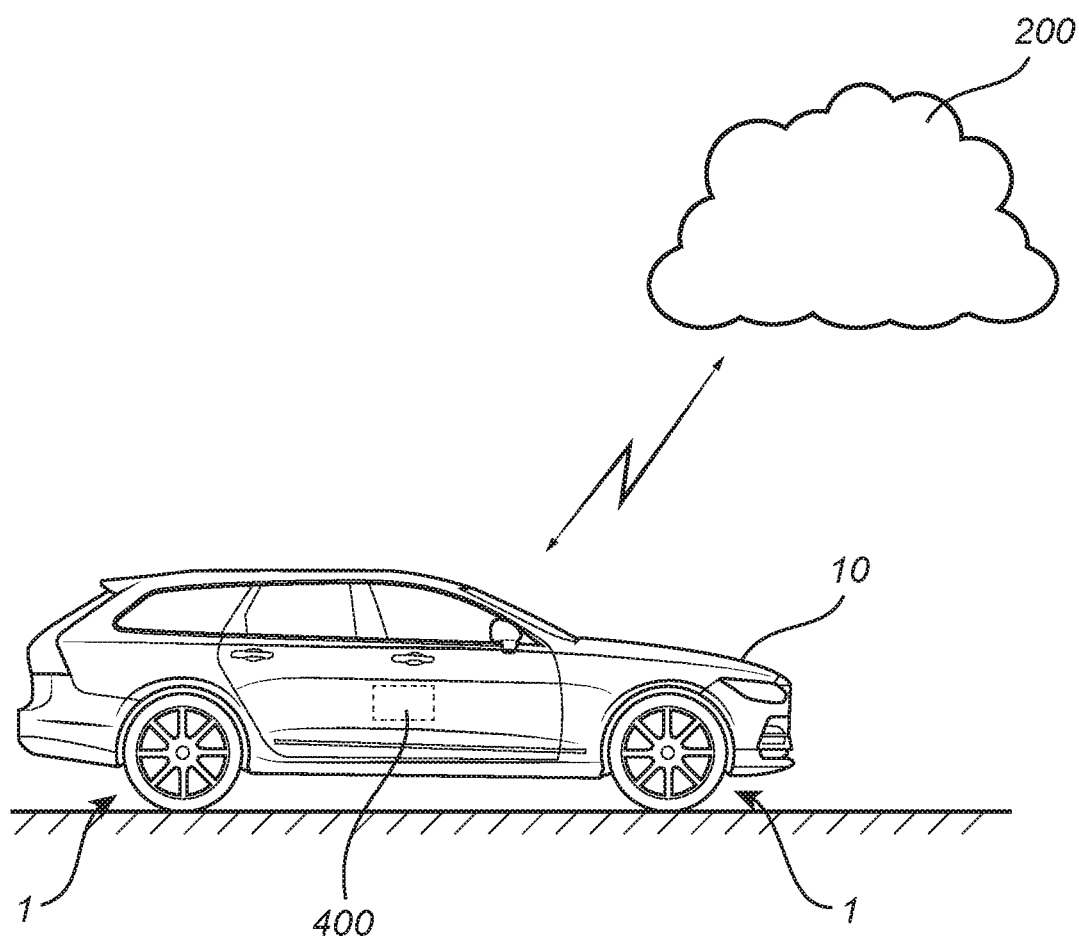
FIG. 6 shows an example of a vehicle according to an embodiment of the present invention.

In FIG. 6 a vehicle 10 comprising an arrangement 1 according to an example embodiment of the present invention is shown. The vehicle 10 comprises a database 400 stored in a memory unit which comprises data representing different risk situations, or first situations. Real-time data from at least one sensing element in the vehicle 10 is compared to the data in the database in order to identify if the vehicle 10 is in a first risk situation. The data may for example be empirical data as described hereinabove, but it could also be data that has been generated by performing computer simulations of different risk situations of a vehicle. Still further, the vehicle 10 may also communicate wirelessly with a data-cloud 200 where more data, such as empirical data, is stored. For example, empirical data may continuously be generated by learning from other accidents by other vehicles and then download this data to the database 400 from the data-cloud 200. Thereby the vehicle 10 may be able to identify even more such risk situations. Of course, also further computer simulated data may be downloaded to the database 400 from the data-cloud 200. As an alternative, such new data may also be downloaded to the database 400 via a cable when for example the vehicle is in a workshop.

Figure 7:
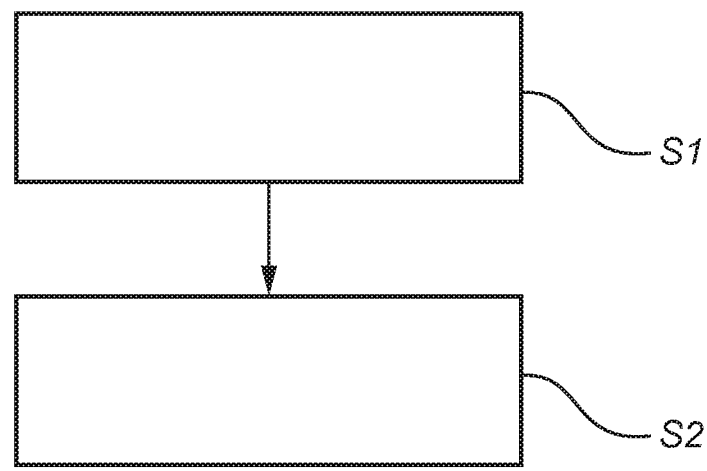
FIG. 7 shows an example embodiment of the method according to the first aspect of the invention.

FIG. 7 shows a flowchart of a method for a vehicle 10 according to an embodiment of the present invention. The vehicle 10 comprises at least one wheel suspension 2 with at least one damper 3, wherein the at least one damper 3 is such that it can adjust its damping resistance between a first damping mode and at least a second damping mode, wherein the second damping mode presents a larger damping resistance than a damping resistance of the first damping mode. The method comprises the steps:

S1) identifying if the vehicle 10 is in a first situation during driving of said vehicle 10 which may lead to a subsequent impact force F on the at least one wheel suspension 2 which is of a magnitude such that the at least one damper 3, when in its first damping mode, will reach a position where no further damping can be performed; and, if this is the case, and S2) adjusting the damping resistance from the first damping mode to the at least second damping mode.

The invention is not limited to the embodiments described herein. It would be evident for the skilled person that other embodiments and modifications to the embodiments specified hereinabove are also possible within the scope of the claims.

The invention claimed is:

1. A method for a vehicle comprising at least one wheel suspension with at least one damper, wherein the at least one damper is such that it can adjust its damping resistance between a first damping mode and at least a second damping mode, wherein the at least second damping mode presents a larger damping resistance than a damping resistance of the first damping mode, said method comprising:

identifying if the vehicle is in a first situation during driving of said vehicle which may lead to a subsequent impact force (F) on the at least one wheel suspension which is of a magnitude such that it is pre-determined that the at least one damper, when in its first damping mode, will reach a position where no further damping can be performed to dampen the impact force (F) associated with the identified first situation; and, if this is the case, adjusting the damping resistance from the first damping mode to the at least second damping mode in which it is pre-determined that the at least one damper can provide further damping to dampen the impact force (F) associated with the identified first situation.

2. The method according to claim 1, wherein the impact force (F) is further of a magnitude such that at least one user of the vehicle may get hurt when the at least one damper is in its first damping mode.

3. The method according to claim 2, wherein the impact force (F) is further of a magnitude such that a spine of the at least one user may get hurt when the at least one damper is in its first damping mode.

4. The method according to claim 1, wherein the adjustment of the damping resistance is performed when the first situation is identified, or at least before the subsequent impact force (F) impacts the wheel suspension.

5. The method according to claim 1, wherein the first situation is identified by measuring at least one of the following:
- an acceleration, or a change of acceleration, in at least one of an x-, y- or z-direction of the vehicle,
- a rotation, or a change of rotation, in respect of at least one of a x-, y- or z axis of the vehicle,
- a speed of the vehicle,
- a driving direction, or a change of a driving direction, of the vehicle,
- a force acting on the at least one wheel suspension during driving,
- a wheel speed of a wheel of the at least one wheel suspension,
- a distance to an external object during driving of the vehicle,
- an altitude change of the vehicle or of at least one wheel of the vehicle during driving,
- that at least one wheel suspension of the vehicle has reached an extended outmost position, and
- a force acting on at least one vehicle seat during driving.

6. The method according to claim 1, wherein the first situation is a situation where at least one side of the vehicle is airborne, or the complete vehicle is airborne.

7. The method according to claim 1, wherein the at least one damper is further configured such that it can adjust its damping resistance to at least a third damping mode which presents a damping resistance which is larger than the damping resistance of the second damping mode.

8. The method according to claim 7, wherein the damping resistance is adjusted from the first damping mode to the at least second or third damping mode depending on the magnitude of the subsequent impact force (F).

9. A computer-readable storage medium storing a program which causes a computer to execute a method according to claim 1.

10. An arrangement for a vehicle, comprising,
- at least one wheel suspension with at least one damper, wherein the at least one damper is such that it can adjust its damping resistance between a first damping mode and at least a second damping mode, wherein the at least second damping mode presents a larger damping resistance than a damping resistance of the first damping mode, wherein the arrangement is adapted to:
- identify if the vehicle is in a first situation during driving of said vehicle which may lead to a subsequent impact force (F) on the at least one wheel suspension which is of a magnitude such that it is pre-determined that the at least one damper, when in its first damping mode, will reach a position where no further damping can be performed to dampen the impact force (F) associated with the identified first situation, and
- adjust the damping resistance from the first damping mode to the at least second damping mode in which it is pre-determined that the at least one damper can provide further damping to dampen the impact force (F) associated with the identified first situation.

11. The arrangement according to claim 10, wherein the at least one damper is further such that it presents at least a third damping mode which presents a damping resistance which is larger than the damping resistance of the second damping mode.

12. The arrangement according to claim 10, wherein the at least one damper is any one of a high impact damper, a pneumatic damper, a hydraulic damper or an electromagnetic damper.

13. The arrangement according to claim 10, further comprising at least one sensing element configured to sense a condition indicative of the first situation.

14. The arrangement according to claim 13, wherein the at least one sensing element is any one of:
- an accelerometer, a gyro-sensor, a speed sensor, a force sensor, a camera, a LIDAR sensor, an ultrasonic sensor, a radar sensor, a sonar sensor, an altitude sensor or a wheel suspension position sensor.

15. A vehicle comprising an arrangement according to claim 10.

* * * * *